(12) United States Patent
Hodges et al.

(10) Patent No.: US 8,671,003 B2
(45) Date of Patent: Mar. 11, 2014

(54) SYSTEM AND METHOD FOR PREDICTION OF DETERIORATION

(75) Inventors: Michael Graham Hodges, Bramley (GB); Thomas Knox, Crowthorne (GB); Kevin Edward Poole, Mayland (GB)

(73) Assignee: BP Oil International Limited, Middlesex (GB)

(*) Notice: Subject to any disclaimer, the term of this patent is extended or adjusted under 35 U.S.C. 154(b) by 28 days.

(21) Appl. No.: 12/448,495

(22) PCT Filed: Dec. 11, 2007

(86) PCT No.: PCT/GB2007/004746
§ 371 (c)(1),
(2), (4) Date: Jun. 22, 2009

(87) PCT Pub. No.: WO2008/078068
PCT Pub. Date: Jul. 3, 2008

(65) Prior Publication Data
US 2010/0100404 A1 Apr. 22, 2010

(30) Foreign Application Priority Data
Dec. 22, 2006 (EP) ..................................... 06256544

(51) Int. Cl.
*G06Q 10/00* (2012.01)
(52) U.S. Cl.
USPC .................. 705/7.11; 702/34; 436/55; 436/61
(58) Field of Classification Search
USPC .......................... 705/7.11; 702/34; 436/55, 61
See application file for complete search history.

(56) References Cited

U.S. PATENT DOCUMENTS

| 4,998,208 A | * | 3/1991 | Buhrow et al. ................. 702/35 |
| 5,841,678 A | * | 11/1998 | Hasenberg et al. ............. 703/10 |
| 5,997,748 A | * | 12/1999 | Rosenberg et al. ........... 210/688 |

(Continued)

FOREIGN PATENT DOCUMENTS

| JP | 2003-027069 | 1/2003 |
| JP | 3789324 | 4/2006 |

OTHER PUBLICATIONS

The "Smart" Refinery: Economics and Technology, by Douglas C. White, Presented at the NRPA 2003 Annual Meeting, Mar. 23-25, 2003, San Antonio, Texas.*

(Continued)

*Primary Examiner* — Peter Choi
*Assistant Examiner* — Darlene Garcia-Guerra
(74) *Attorney, Agent, or Firm* — Nixon & Vanderhye

(57) ABSTRACT

System and method for predicting the rate of deterioration in one or more items of process equipment which are subject to deterioration by one or more deterioration mechanisms. The system includes a first item of process equipment which receives an inlet stream including a feedstock or derivative thereof, and discharges one or more outlet streams which can be fed to the item of process equipment. A data processor which is a programmed computer including at least one rate model for the first item of process equipment receives values of one or more properties of the feedstock and calculates predicted rates of deterioration by the one or more deterioration mechanisms for the first item of process equipment from the values of one or more of the feedstock properties. The data processor additionally provides an output containing information relating to the predicted rates of deterioration by the one or more deterioration mechanisms for the first item of process equipment.

19 Claims, 2 Drawing Sheets

(56) References Cited

U.S. PATENT DOCUMENTS

| | | | |
|---|---|---|---|
| 6,047,241 A * | 4/2000 | Sparago | 702/34 |
| 2002/0169882 A1* | 11/2002 | Fayemi | 709/229 |
| 2004/0106204 A1* | 6/2004 | Chimenti et al. | 436/55 |
| 2006/0161397 A1* | 7/2006 | Hayzen et al. | 702/185 |
| 2006/0288756 A1* | 12/2006 | De Meurechy | 73/1.01 |
| 2007/0100082 A1* | 5/2007 | Dickakian et al. | 525/333.7 |
| 2007/0199379 A1* | 8/2007 | Wolf et al. | 73/590 |
| 2008/0059081 A1* | 3/2008 | Gualandri et al. | 702/34 |
| 2008/0128325 A1* | 6/2008 | Khan et al. | 208/67 |
| 2008/0248967 A1* | 10/2008 | Butler et al. | 506/12 |
| 2008/0260584 A1* | 10/2008 | Gudde et al. | 422/69 |
| 2008/0262795 A1* | 10/2008 | Webb et al. | 702/184 |

OTHER PUBLICATIONS

Increased Refinery Profuctivity through Online Performance Monitoring by Douglas C. White, Presented at the NRPA2001 Computer Conference, Oct. 1-3, Dallas, Texas.*

International Search Report for PCT/GB2007/004746, mailed Mar. 11, 2008.

Written Opinion of the International Searching Authority for PCT/GB2007/004746, mailed Mar. 11, 2008.

* cited by examiner

SYSTEM AND METHOD FOR PREDICTION OF DETERIORATION

This application is the U.S. national phase of International Application No. PCT/GB2007/004746, filed 11 Dec. 2007, which designated the U.S. and claims priority to European Application No. 06256544.5, filed 22 Dec. 2006, the entire contents of each of which are hereby incorporated by reference.

BACKGROUND OF THE INVENTION

This invention relates to the field of deterioration prediction, more specifically to predicting the rate of deterioration in one or more items of process equipment from one or more feedstock properties.

Corrosion is a pervasive problem in the refining of crude oil, and necessitates the constant monitoring and inspection of the various processing units within a refinery. Often, the refinery units need to be fabricated from expensive corrosion-resistant materials in order to have sufficient lifetime before replacement, particularly units which are exposed to high temperatures and corrosive compositions.

Different crude oils are known to have different corrosive properties. Typical sources of corrosion from crude oils include the presence of one or more of oxygen, water, acidic species such as naphthenic acids, or other reactive species such as sulphur-containing compounds.

Over time, a large body of information has been collated on the types of corrosion experienced in various refinery units, based on the materials of construction of the refinery units. Such data have been published, for example by the American Petroleum Institute in document API-581.

API-581 comprises, inter alia, means for estimating the lifetime of a refinery unit from the extent and nature of visible corrosion present within the unit, based on the materials of construction and the function or duty which it performs. However, the model is only an estimate, and is not necessarily capable of predicting the corrosion rate of a freshly installed, corrosion-free unit, nor is it capable of estimating the extent of corrosion when different types of crude oil having different corrosion properties are fed to the refinery. The models are therefore not always accurate, and can result in unplanned shutdowns due to the unexpected need to repair or replace a corroded unit earlier than planned.

Another problem experienced in crude oil refineries is the deactivation of catalysts, which can be used in several refining processes such as fluid catalytic cracking, catalytic reforming, hydrocracking and hydrodesulphurisation. Not only do different crude oils have different effects on the type and rate of corrosion, for example, but also they can have different effects on the rate of catalyst deactivation. Although catalyst lifetimes can be estimated to some extent based on experience, the estimates typically do not encompass the effects of using different feedstocks throughout the catalyst lifetime. The potential for the early and unexpected need to replace or regenerate a prematurely deactivated catalyst is therefore a disruptive and expensive possibility.

A further problem experienced in refinery processes is fouling of items of process equipment by waxy or other solid residues that can build up in process equipment, such as pipework, vessels and columns. Such fouling reduces process efficiency by restricting flow rates and heat transfer.

An apparatus and method capable of predicting the effects of corrosion, fouling and catalyst deactivation of process equipment in the presence of different feedstocks would therefore be highly desirable.

SUMMARY OF THE INVENTION

According to a first aspect of the present invention, there is provided a system for predicting the rate of deterioration in one or more items of process equipment, which system comprises;
(a) a first and optionally further items of process equipment, which first item of process equipment is adapted to receive an inlet stream comprising a feedstock or derivative thereof, and to, discharge one or more outlet streams, which one or more outlet streams can optionally be fed to one or more further items of process equipment, which first and optional further items of process equipment are subject to deterioration by one or more deterioration mechanisms;
(b) a data processor adapted to receive values of one or more properties of the feedstock, and adapted to calculate predicted rates of deterioration by the one or more deterioration mechanisms for the first and optionally further items of process equipment from the values of one or more of the feedstock properties, which data processor is additionally adapted to provide an output comprising information relating to the predicted rates of deterioration by the one or more deterioration mechanisms for the first and optionally further items of process equipment.

The system of the present invention is used to predict the rate of deterioration in one or more items of process equipment based on the values of one or more properties of the feedstock. It comprises a data processor capable of providing an output comprising information relating to the predicted rate of deterioration. The one or more feedstock properties are typically analytical data, which can be correlated to deterioration effects in one or more items of process equipment by one or more deterioration mechanisms.

In use, the first item of process equipment receives an inlet stream, and discharges one or more outlet streams, which are optionally fed to one or more further items of process equipment. The inlet stream typically comprises a feedstock or a derivative of the feedstock, for example a process stream resulting from a reaction or other type of processing of the feedstock.

In one embodiment of the invention, the feedstock is crude oil, and the first item of process equipment is a crude distillation unit. Often, in crude oil refineries, the crude oil is initially fed to a pre-flash column to remove light, low boiling components, for example C1 to C4 hydrocarbons. The non-vapourised portion, thereafter deficient in the C1 to C4, hydrocarbons compared to the crude oil feedstock, is subsequently fed to the crude distillation unit. Thus, in one embodiment of the invention, the first item of process equipment is the crude distillation unit, the feedstock is crude oil, and the inlet stream is the non-vapourised portion from the pre-flash column that is fed to the crude distillation unit. In this embodiment, the crude distillation column discharges a number of output streams, these being the various fractions separated from the feedstock stream on the basis of boiling point.

In another embodiment of the invention, crude oil is the feedstock, a diesel hydrotreater is the first item of process equipment, the feed to the hydrotreater is the inlet stream, and the hydrotreater discharges an outlet stream comprising hydrogenated and desulphurised diesel fuel.

In a further embodiment of the present invention, crude oil is the feedstock, the crude distillation column is the first item of process equipment, the diesel hydrotreater is a further item of process equipment, the inlet stream is the non-vapourised fraction from the pre-flash column that is fed to the crude distillation unit, and one of the outlet streams is a middle distillate fraction that is fed to the diesel hydrotreater.

In yet another embodiment of the present invention, the first item of process equipment is a diesel hydrotreater, and the middle distillate feed to the hydrotreater is both the feedstock and the inlet stream, such that the one or more properties of the inlet stream relate to the middle distillate fraction itself, and not of the crude oil from which it is derived.

Deterioration of an item of process equipment occurs through one or more deterioration mechanisms, the rate of deterioration by each of which can be calculated by the data processor. Examples of deterioration mechanisms include corrosion, fouling (for example through deposition of waxy or crystalline deposits), and catalyst deactivation (for example through increased catalyst coking or loss of active components). Deterioration mechanisms therefore encompass not only physical or chemical deterioration of the process equipment itself, but also deterioration of performance of any reaction or other type of treatment that may occur therein.

The system of the present invention comprises a data processor, which is adapted to receive an input comprising values of one or more feedstock properties. In one embodiment, the feedstock property values may be obtained directly from the feedstock source, and the system can additionally comprise for example one or more analysers which may be on-line analysers or analysers located remotely, for example in an analytical laboratory. The one or more analysers can include, for example, sensors for measuring parameters such as optical properties, for example infrared, near infrared, visible or ultra-violet absorption or transmission at one or more wavelengths, devices for determining composition, for example a GC device fitted with mass-spectroscopic, flame induction or thermal conductivity detectors. The one or more analysers can include conductivity sensors for detecting conductivity of an item of process equipment, for example to determine the extent of corrosion, or for detecting the conductivity properties of the feedstock, for example to determine the extent of metal ions in or the acidity of the feedstock. The one or more analysers can be interfaced with the data process through a wired or wireless network.

In an alternative embodiment, the values may be obtained from a database of feedstock analytical data stored, for example, within the data processor. The data processor is suitably a computer, in which the database of feedstock analytical data can be stored for example in RAM or ROM memory, or on a computer-readable medium, such as a computer or server hard-drive, or on removable media such as on one or more compact, digital versatile or floppy disks. In a further embodiment, the values may be input manually, for example by inputting values from a certificate of analysis through a keyboard, or by downloading values from a remote interne site from an electronic certificate of analysis.

The system uses the input feedstock values to calculate the predicted deterioration rates by the one or more deterioration mechanisms for each item of process equipment. This is suitably achieved by providing one or more predictive models, each of which is capable of predicting the rate of deterioration in one or more items of process equipment by one or more of the deterioration mechanisms from the value of one or more of the feedstock properties. Such models are henceforth referred to as rate models.

In one embodiment, the means for calculating the predicted rate of deterioration by the one or more deterioration mechanisms for each item of process equipment from the values of one or more of the feedstock properties is a computer, and the rate models are incorporated into, or can be loaded into or otherwise received by, a computer programme which can be run or executed from the computer. The executable computer programme and/or the associated rate models, can be stored on the computer, or can be stored on a remote server or other storage means to which the computer is interfaced, for example through a local area network connection, or through an intranet or internet connection. Suitably, data on parameters such as planned lifetime, pre-determined rates of deterioration, replacement costs and depreciation rates of the one or more items of process equipment are incorporated into the computer programme, or can otherwise be accessed or received by the computer programme.

Output can be, for example, in paper or electronic form, such as a typed or printed report, a screen display, or as an electronic file.

Typically, the rate models are derived from historical data, either collected on a particular item of process equipment, or from published data. Typically, separate models are required for each item of process equipment, due to the different compositions and/or conditions experienced in different parts of a process and the potentially different materials of construction. Each item of process equipment may have one or more associated rate models, for example for predicting rates of deterioration for each different deterioration mechanism from one or more of the feedstock property values.

As an example, for a process in which there are four items of process equipment (E1, E2, E3 and E4), three deterioration mechanisms (D1, D2 and D3), and two feedstock variables (V1 and V2), the number of rate models can be as follows:

Four rate models; one for each item of process equipment, in which the deterioration rates for all three deterioration mechanisms are simultaneously calculated from the values of all the feedstock properties.

or;

Eight rate models; two for each item of process equipment, in which the deterioration rates for all three deterioration mechanisms are calculated from each separate feedstock property value.

or;

Twelve rate models; three for each item of process equipment, in which separate models are used to calculate the rate of deterioration for each deterioration mechanisms from the values of all the feedstock properties.

or;

Twenty four rate models; six for each item of process equipment, in which the deterioration rate for each deterioration mechanism is separately calculated from each separate feedstock property variable.

These options are graphically illustrated in FIGS. 1 to 4 respectively.

In one embodiment, different feedstock properties are used to calculate the rate of deterioration through different deterioration mechanisms. For example, as shown in FIG. 5, deterioration mechanism D1 may be calculated from variable V1, deterioration mechanism D2 from variable V2, and deterioration mechanism D3 from a combination of V1 and V2.

Where a rate model is based on the values of more than one feedstock property, for example from the values of more than two feedstock properties, the rate model may be created using a multivariate approach, for example using partial least squares analysis. Partial least squares analysis utilises a calibration data set comprising known values of one or more dependent variables and one or more independent variables, and provides a calibration model by which the values for the one or more dependent variables can be calculated from one or more independent variables. In the present invention, the independent variables are the one or more feedstock properties, while the one or more dependent variables are the deterioration rates by the one or more deterioration mechanisms.

In a preferred embodiment of the invention, the rate models can be updated. For example, a rate model may be updated on the basis of comparing historical deterioration rates with measured deterioration rates, such as after inspection of process equipment or catalysts, or from on-line sensors. By such means, a model originally based on, for example, generic published tables of data or historical data from a different but related process may be modified in view of actual operations on an individual item of process equipment.

The rate of deterioration of the one or more items of process equipment can be used directly as the output. Additionally, or alternatively, the output can comprise parameters calculated from the predicted rates of deterioration, such as the predicted lifetime of the one or more items of process equipment. For example, the planned lifetime of each item of process equipment can be associated with a pre-determined rate of deterioration by one or more of the deterioration mechanisms. Any predicted deterioration rates above or below the pre-determined rate results in a corresponding predicted decrease or increase respectively in the lifetime compared to plan. This can be calculated on the basis of one or more of the predicted deterioration rates, or directly from the values of one or more of the feedstock properties. In one embodiment, the rate models are adapted to provide predicted lifetimes of the one or more items of process equipment by one or more deterioration means by one or more of the feedstock properties, either instead of or in addition to the predicted rates of deterioration. Alternatively, in another embodiment, the predicted lifetime can be calculated from one or more predicted rates of deterioration, the predicted lifetime for each item of process equipment being calculated from a comparison of the predicted rate of deterioration derived from the one or more rate models and the planned lifetime and the pre-determined rate of deterioration associated with each item of process equipment.

The predicted rate of deterioration and/or predicted lifetime of an item of process equipment can be calculated for each different deterioration mechanism separately, and the output may comprise a single value which is the lowest of the separately predicted lifetimes and/or highest of the separately predicted deterioration rates.

The system can be used to control the rate of deterioration in one or more items of process equipment by influencing feedstock selection. For example, by using feedstocks of relatively low deterioration potential, i.e. feedstocks that result in relatively low predicted rates of deterioration, then the predicted lifetime of one or more items of process equipment can potentially be extended to beyond that originally planned, which can increase the lifetime of the equipment, and delay any capital expenditure necessary to replace or repair it. Conversely, as items of equipment are often replaced at their originally planned time, regardless of whether it could have a longer lifetime, for purposes of Maintenance scheduling and minimising process down-time, an opportunity arises to use feedstocks with higher deterioration potential, which are often significantly cheaper than feedstocks with low deterioration potential. Therefore, by using the system of the present invention, control over the rate of deterioration in one or more items of process equipment can be achieved through feedstock selection, enabling maintenance schedules and shut-down plans to be adhered to more efficiently, providing considerable efficiency savings by reducing unplanned or early shut-downs, and enabling significant cost savings to be achieved by maximising the usage of cheaper, albeit potentially more harmful, feedstocks. A further advantage is the ability to capture value associated with low priced, high quality (low deterioration potential) feedstocks. Using such feedstocks can extend the life of the one or more items process equipment, which enables lower quality, high deterioration potential feedstocks to be used at a later date, for example when the price of high quality feedstocks subsequently increases. The result is that lifetime of the equipment remains according to plan, while increasing the flexibility of the process to enable low cost feedstock opportunities to be captured.

In a further embodiment of the present invention, in which the predicted deterioration rate or predicted lifetime of the one or more items of process equipment suggests that the equipment may need, to be replaced or repaired earlier than planned, then deterioration inhibitors can be employed, or their quantity or rate of addition can be increased. For example, if corrosion is more extensive than expected, then a corrosion inhibitor may be added, or the rate of addition may be increased if one is already being added. Additionally, or alternatively, the process conditions within the item of process equipment can be modified to reduce the rate of deterioration. Again using the example of corrosion, if the corrosion rate in an item of process equipment is greater than expected, then process conditions can be altered to reduce the rate of corrosion, for example by altering temperature and/or pressure.

The system of the present invention can comprise a means for calculating the cost impact of a feedstock on the process, and enabling the ranking of a plurality of feedstocks to be made on the basis of the cost impact they may have on one or more of the items of process equipment, compared to the feedstock cost. The means of calculating cost impact is suitably incorporated into the data processor. For each item of process equipment, the system may also comprise a replacement value for the item of process equipment, which can be used to calculate a depreciation value based on the predicted lifetime of the item. In one embodiment, a depreciation value for each item of process equipment is calculated from the planned lifetime and the replacement cost of the item. If the predicted lifetime of the item is calculated to be lower than planned, then the depreciation value will be higher. If the predicted lifetime is longer, then optionally the depreciation value can either be maintained as planned (for example if the item is going to be changed-out at the planned time regardless of any predicted increase in lifetime), or alternatively decreased due to the potentially extended lifetime.

By performing this calculation over the one or more items of process equipment for a plurality of feedstocks, a predicted cost impact compared to plan for the items of process equipment for a selected feedstock can be calculated. A plurality of feedstocks can therefore be ranked by comparing their predicted cost impact over the one or more items of process equipment with the cost of procuring each feedstock, and thus enabling optimal choice of feedstock to be made.

An item of process equipment may be a vessel, for example a reactor, separator or flash vessel, a distillation column, a pipe or conduit, or any other item that contacts the feedstock or feedstock derivative. An item of process equipment may comprise a group of components associated with a larger unit, for example a distillation column typically comprises a collection of separation trays, hence in this case the item of process equipment can comprise not only the distillation column itself, but also the associated separation trays.

The system can be used in a method of predicting the rate of deterioration in one or more items of process equipment. Thus, according to a second aspect of the present invention, there is provided a method of predicting the rate of deterioration of a first and optionally further items of process equipment, which first item of process equipment receives an inlet stream and discharges one or more outlet streams which are optionally fed to one or more further items of process equipment, which first and optional further items of process equipment are subject to deterioration by one or more deterioration mechanisms, which inlet stream comprises a feedstock or derivative thereof, and which method comprises the steps of;

(a) obtaining values of one or more properties of the feedstock, (b) calculating a predicted rate of deterioration by the one or more deterioration mechanisms for each item of process equipment from the values of one or more of the feedstock properties; and (c) providing an output comprising information relating to the predicted rate of deterioration for each item of process equipment.

In one embodiment of the method of the present invention, a system as hereinbefore described is used for calculating the predicted rate of deterioration by the one or more deterioration mechanisms for each item of process equipment from the values of one or more of the feedstock properties.

In the method of the present invention, an inlet stream is fed to a first item of process equipment, from which one or more outlet streams are discharged and optionally fed to one or more further items of process equipment. The inlet stream is either the feedstock itself, or is a derivative of the feedstock.

In one embodiment of the present invention, the process is an integrated chemicals process, for example the cracking of ethane or naphtha in a steam cracker to produce olefins, which olefins are then fed to subsequent items of processing equipment such as a polyolefins reactor, a hydration reactor for producing alcohols, an olefin oligomerisation reactor, or an olefin epoxidation reactor.

In an alternative embodiment of the present invention, the process involves the conversion of a feedstock to syngas (a mixture of hydrogen and carbon monoxide), and the syngas used to produce further compositions, such as liquid fuels through Fischer-Tropsch reactions, or to other chemicals, for example methanol or other alcohols.

In a preferred embodiment of the invention, the process is the refining of crude oil, and the items of process equipment are one or more units within a crude oil refinery, for example selected from a crude oil distillation unit, a vacuum distillation unit, a fluid catalytic cracking unit, a hydrocracking unit, a hydrotreating unit, an isomerisation unit and a catalytic reforming unit.

The crude oil feedstock may be selected from a wide variety of sources with potentially widely varying chemical and physical properties.

In a crude oil refinery, the crude oil, after optionally being pre-treated to remove, for example, solid or gaseous residues, is typically fed to a crude distillation unit, wherein it is separated into various fractions depending on boiling point. Thus, in one embodiment, the crude distillation-unit is the first item of process equipment, crude oil is the feedstock, and the inlet stream is the crude oil feedstock after any processing stages before being fed to the crude distillation unit, for example after any pre-flash separation stages.

The separate fractions from the crude distillation unit are removed and fed to subsequent processing units for converting the fractions to higher value fuels or other products, for example gasoline, diesel, kerosene, aviation fuel, heating oil and the like. Examples of refinery processes that are used to upgrade crude oil fractions include vacuum distillation, fluid catalytic cracking, hydrocracking, hydrotreating, catalytic reforming and isomerisation.

Heavy crude oils with higher levels of components such as long-chain (heavy) hydrocarbons and/or asphaltenes, may cause higher levels of fouling, where waxy deposits can build up in items of process equipment, or can cause fouling or coking of a catalyst. Heavier crudes typically increase the workload of units such as those associated with vacuum distillation and fluid catalytic cracking operations, which are typically used to improve yields of liquid fuels such as gasoline, kerosene and diesel. Other components of a crude oil that may cause fouling include the presence of ions such as one or more of $Na^+$, $Mg^{2+}$, $Ca^{2+}$, $Ba^{2+}$, $Cl^-$, $SO_4^{2-}$, $NO_3^-$, $NO_2^-$, $CN^-$, transition metal ions such as ions of Ni, V and/or Fe, and other heavy main group ions such as As or Hg, which can cause formation of crystalline deposits within process equipment, even at low levels, for example ppb levels. Additionally, the presence of bacteria can cause the deposition of solid residues or "bacterial mats", which are often associated with exposure to water, particularly free water that may separate out, for example, from crude oil or a derivative thereof held in a storage tank or vessel.

The extent of fouling in process equipment may be calculated by methods such as measurement of pressure drop, achieved for example by measurement of flow rate and/or by measuring the extent of valve opening required to maintain a particular flow rate. Measurements may be made using pressure sensors, flow rate meters, or from a valve controller output. The output from such sensors, controllers and meters is preferably in the form of an electronic signal that can be transmitted through wires or wirelessly to the data processor.

Crude oil samples with high levels of naphthenic acid, high total acid numbers (TAN), high concentrations of heteroatom-containing hydrocarbons, for example sulphur and/or nitrogen-containing compounds, can be associated with increased levels of corrosion in items of process equipment. The presence of carbon dioxide can also contribute to corrosion. Corrosion effects can be exacerbated under conditions of high temperature and pressure. In addition, the effects can be different for different materials of construction, in that low corrosion resistant materials will be more subject to damage compared to materials with higher corrosion resistance for the particular duty that they must perform.

The extent of corrosion or corrosion rates may be determined by, for example, measurement of electrical conductivity or resistivity, by ultrasonic measurements, or by measurement of hydrogen flux through or on the item of process equipment. The extent of corrosion can be measured on the process equipment itself, or can alternatively be measured on a sample or coupon made of the same material as the item of process equipment, which is attached to relevant monitoring equipment and/or sensors, and which is contacted with the contents of the item of process equipment under the same conditions, for example by being located within the item of process equipment itself.

The concentrations of various components, for example naphthenic acid, carbon dioxide and/or heteroatom-containing components, can be determined by chromatographic techniques (such as gas-chromatography), or by optical analysis at one or more wavelengths, for example using infrared or near infrared spectroscopy. Such techniques are readily applied on-line, although can also be performed off-line. Additionally, values for the total acid number (TAN) can be obtained, for example using the method described in ASTM D664.

Some items of process equipment may comprise catalyst for catalysing a conversion reaction on the feedstock, feedstock derivative or component thereof. Different types of feedstock may have different deterioration impacts on the catalyst, which may negatively impact catalyst lifetime. For example high sulphur levels in a crude oil feedstock, for example, will increase the consumption of any sulphur absorbents, such as zinc oxide, and may contribute to increased catalyst deactivation in hydrocracking and/or hydrotreating units.

In the case of heteroatom-containing hydrocarbons, for example sulphur and nitrogen-containing compounds, the heteroatom may be present in many different types of compound. For example, in the case of sulphur, it may be present in crude oil in the form of sulphides, thiophenes, benzothiophenes and mercaptans. During processing, it may be converted to other forms such as hydrogen sulphide, for example in a hydrotreater. Different sulphur species may have different impacts on deterioration in the various items of process equipment, and therefore the levels of each separate sulphur species may be used to calculate predicted deterioration rates. The concentrations of the individual compounds may be detected by known means, for example by chromatographic techniques or by optical means, such as infrared and/or near infrared spectroscopic analysis, preferably on-line. Alternatively, values for total heteroatom content may be obtained using tests described in ASTM D1552 for total sulphur, and ASTM D4629 for measurement of total nitrogen.

Actual rates of deterioration by one or more deterioration mechanisms may be monitored on items of process equipment, either directly or indirectly. The measured deterioration rates for each of the deterioration mechanisms can then be compared to the predicted deterioration rates. If there is a significant discrepancy, then the rate models used can be updated accordingly to provide a more robust prediction of future deterioration, and hence to improve the prediction of the rate of deterioration and/or lifetime of the process equipment.

The values of the one or more properties of the feedstock can be obtained from a mixture of one or more feedstocks, derived for example from different sources. As an example, crude oil is typically stored in large storage tanks before being fed to a crude distillation unit. The contents of a storage tank can often comprise a mixture of more than one crude oil from different sources, hence in one embodiment of the invention the values of the one or more feedstock properties are predicted values based on a calculated mixture of storage tank contents and the crude oil feedstock or cargo that is to be fed thereto. This method is advantageous, for example, when an analysis of a crude oil cargo that is potentially to be procured is available. Before an offer is made, the values of the feedstock properties from the analysis can be used to predict the deterioration and cost impact on the one or more items of process equipment. This allows more efficient purchasing decisions to be made, for example by calculating a optimal bid price for the cargo, or by identifying a refinery which could benefit from the cargo, based on parameters such as the total cost of procuring the cargo, its transportation to the refinery and the mix of crude oil already in the refinery storage tanks. It can also be used to rank a plurality of feedstocks, based on the cost or price of the feedstock and its effect on equipment lifetime, and hence its effect on the predicated rate of depreciation on the one or more items of process equipment.

The system and method of the present invention are particularly useful for predicting deterioration rates in items of process equipment that are exposed to highly corrosive environments. For example, in a crude oil refinery, items of process equipment exposed to untreated crude oil at elevated temperatures and pressures, for example units of the refinery upstream of processes that remove heteroatom-containing compounds through processes such as hydrocracking or hydrotreating, are particularly vulnerable to corrosion. This includes in particular the crude distillation unit, the vacuum distillation unit, and any equipment associated therewith, such as reboilers, valves, heat exchangers, reflux equipment and other pipework and conduits.

In a further embodiment of the invention, analysis of the crude oil is obtained after its discharge into a storage tank, measurements being made either on-line, or alternatively off-line from samples extracted from the tank and taken, for example, to a remote laboratory.

BRIEF DESCRIPTION OF THE DRAWINGS

The invention is now illustrated by the following non-limiting example, and with reference to the Figures in which.

DETAILED DESCRIPTION OF PREFERRED EMBODIMENTS

Figure 1:
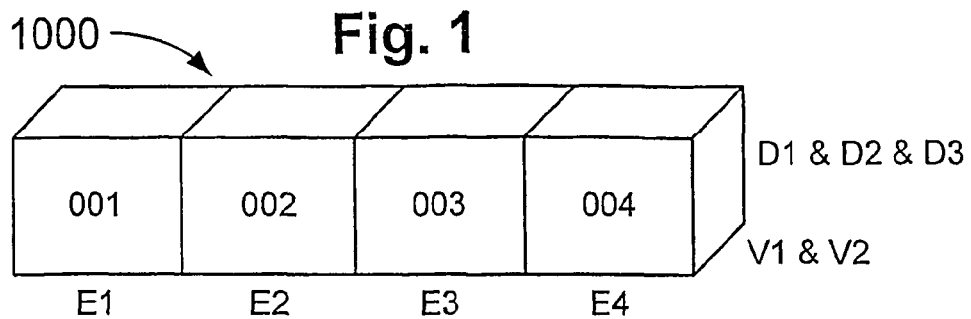
FIG. 1 is a schematic illustration of a group of four example rate models for predicting the rate of deterioration of four items of process equipment.

In FIG. 1, a group 1000 of four example rate models (001, 002, 003 and 004) are illustrated, in which each rate model is used to predict the deterioration of an item of process equipment (E1, E2, E3 or E4) by three different deterioration mechanisms (D1, D2 and D3) from the values of two feedstock property variables (V1 and V2).

Figure 2:
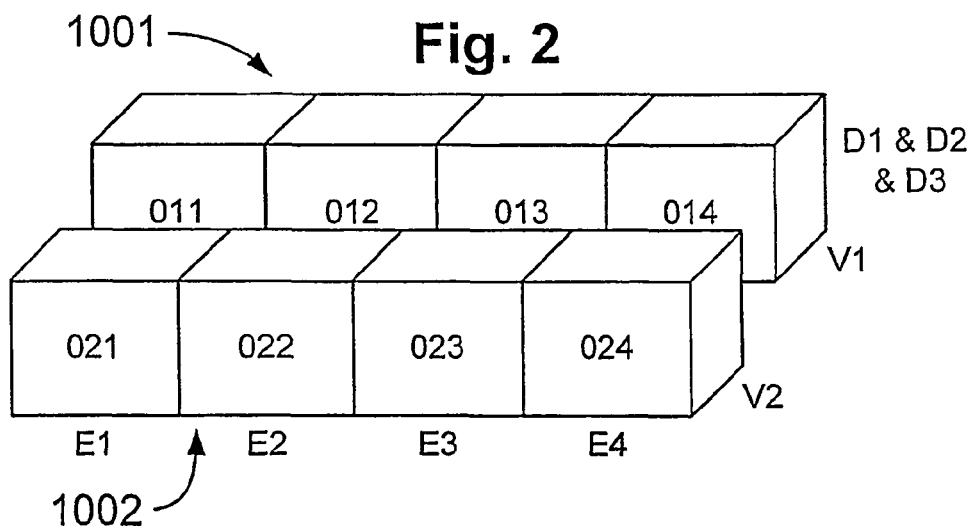
FIG. 2 is a schematic illustration of two groups of example rate models for predicting the rate of deterioration of four items of process equipment.

In FIG. 2, two groups 1001 and 1002 of four example rate models are illustrated, one group 1001 comprising rate models 011, 012, 013 and 014, the other group 1002 comprising rate models 021, 022, 023 and 024. Each model is used to predict the deterioration rate for an item of process equipment (E1, E2, E3 or E4) by three different deterioration mechanisms (D1, D2 and D3) from the value of one feedstock property variable (V1 or V2).

Figure 3:
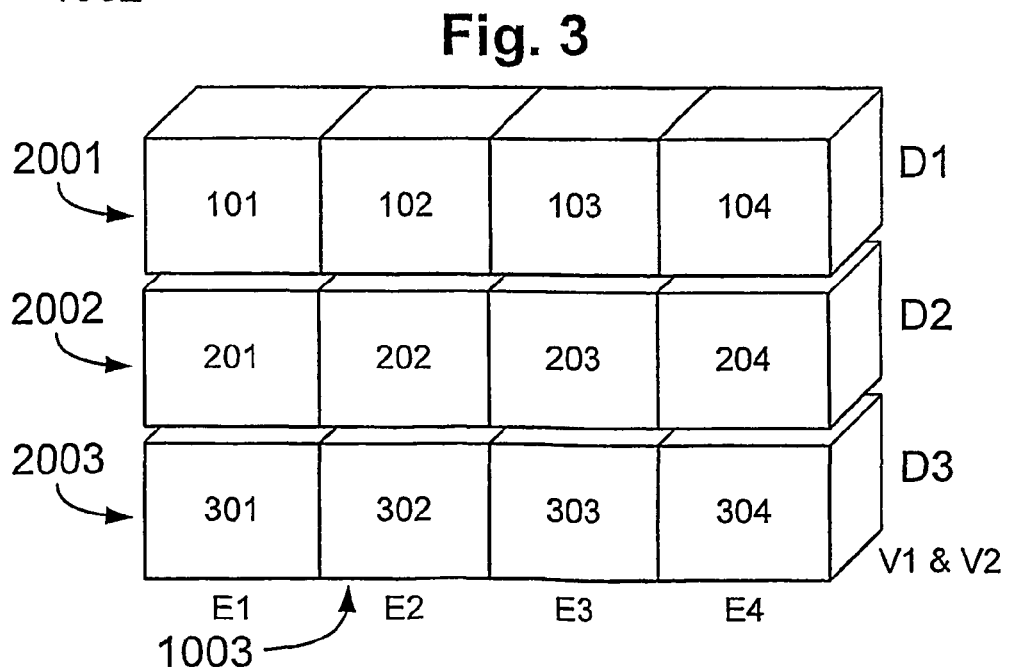
FIG. 3 is a schematic illustration of a group of three sets of example rate models for predicting the rate of deterioration of four items of process equipment.

In FIG. 3, a group 1003 of three sets 2001, 2002 and 2003 of example rate models is illustrated, one set 2001 comprising rate models 101, 102, 103 and 104, the second set 2002 comprising 201, 202, 203 and 204, and the third set 2003 comprising rate models 301, 302, 303 and 304. Each rate model is used to calculate the predicted deterioration rate for an item of process equipment (E1, E2, E3 or E4) by one of three deterioration mechanisms (D1, D2 or D3) from the values of two feedstock property variables (V1 and V2).

Figure 4:
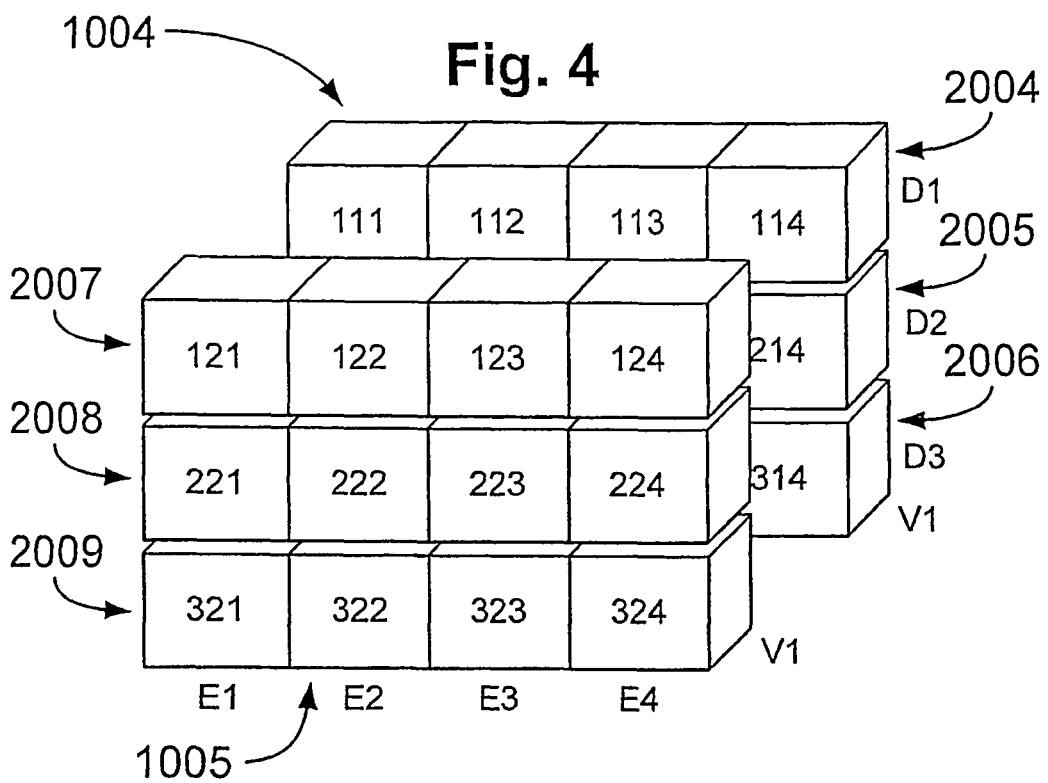
FIG. 4 is a schematic illustration of two groups of three sets of example rate models for predicting the rate of deterioration of four items of process equipment.

In FIG. 4, two groups 1004 and 1005 of example rate models are illustrated. One group 1004 comprises three sets of rate models 2004, 2005 and 2006. Set 2004 comprises rate models 111, 112, 113 and 114, set 2005 comprises rate models 211, 212, 213 and 214 (the first three of which are not shown in the Figure), and set 2006 comprises rate models 311, 312, 313 and 314. In the other group 1005, there are three sets of rate models 2007, 2008 and 2009. Set 2007 comprises rate models 121, 122, 123 and 124, set 2008 comprises rate models 221, 222, 223 and 224, and set 2009 comprises rate models 321, 322, 323 and 324. Each rate model is used to calculate the predicted deterioration rate for an item of process equipment (E1, E2, E3 and E4) by one of the deterioration mechanisms (D1, D2 or D3), from the value of one of the feedstock property variables (V1 or V2).

Figure 5:
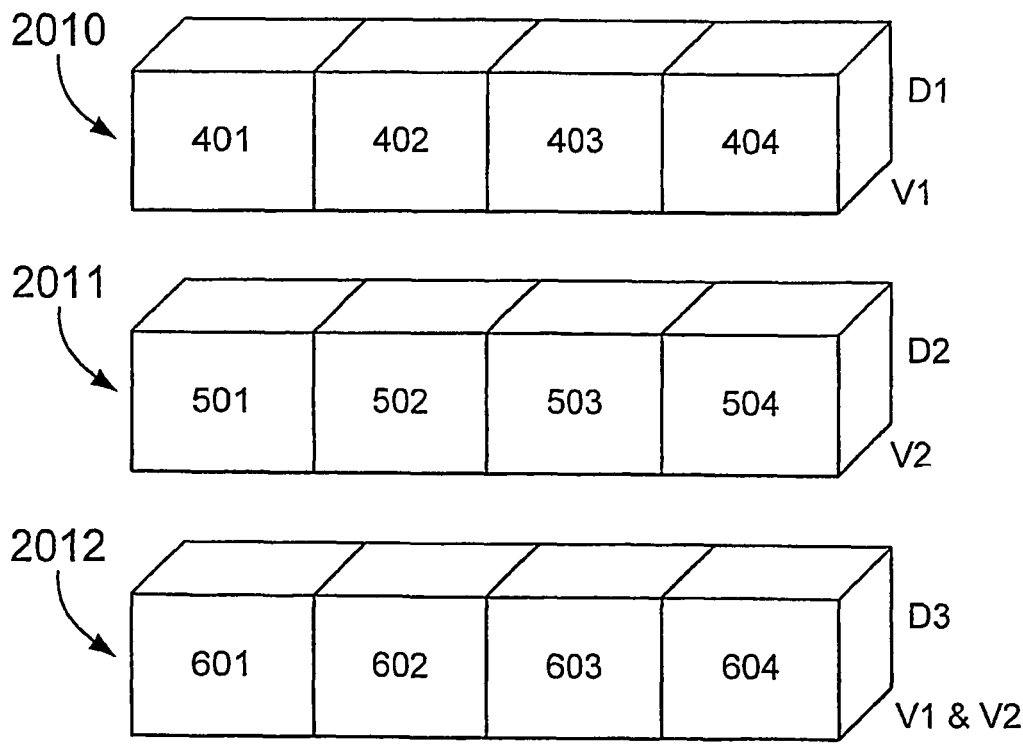
FIG. 5 is a schematic illustration of three sets of example rate models for predicting the rate of deterioration of four items of process equipment

In FIG. 5, there are three sets of example rate models 2010, 2011 and 2012; one set 2010 comprises rate models 401, 402, 403 and 404, each of which are used to calculated the predicted rate of deterioration by one deterioration mechanism (D1) from the values of one of the feedstock property variables (V1) for each of the four items of process equipment (E1, E2, E3 and E4). A second set 2011 comprises rate models 501, 502, 503 and 504, each of which is used to calculate the predicted rate of deterioration by a different deterioration mechanism (D2) from the values of a different feedstock property variable (V2) for each of the four items of process equipment. The final set 2012 comprises rate models 601, 602, 603 and 604, which are used to calculate the predicted rate of deterioration by a third deterioration mechanism (D3) from the values of both feedstock property variables (V1 and V2) for the four items of process equipment.

The invention claimed is:

1. A system for predicting the rate of deterioration in one or more items of process equipment, which system comprises:
    (a) a first item of process equipment, which first item of process equipment is adapted to receive an inlet stream comprising a feedstock or derivative thereof, and to discharge one or more outlet streams, which one or more outlet streams can optionally be fed to said first item of process equipment, which first item of process equipment is subject to deterioration by one or more deterioration mechanisms;
    (b) a data processor adapted to receive values of more than one property of the feedstock, and adapted to calculate predicted rates of deterioration by the one or more deterioration mechanisms for the first item of process equipment from the values of more than one of the feedstock properties, which data processor is additionally adapted to provide an output comprising information relating to the predicted rates of deterioration by the one or more deterioration mechanisms for the first item of process equipment, wherein the data processor is a programmed computer and comprises at least one rate model for said first item of process equipment;
    in which the output comprises the predicted rate of deterioration and/or the predicted lifetime of said first item of process equipment for at least one deterioration mechanism, or the lowest calculated predicted lifetime and/or rate of deterioration for said first item of process equipment; and
    wherein the data processor comprises or is adapted to receive a depreciation value for said first item of process equipment, and the output additionally comprises a predicted rate of depreciation for said first item of process equipment.

2. A system as claimed in claim 1, in which the at least one rate model is updatable.

3. A system as claimed in claim 1, in which the data processor comprises or is adapted to receive information relating to the planned lifetime of said first item of process equipment, and also is adapted to calculate or is adapted to receive a pre-determined rate of deterioration for said first item of process equipment based on the planned lifetime.

4. A system as claimed in claim 1, in which the first item of process equipment is from a crude oil refinery.

5. A system as claimed in claim 4, in which the first item of process equipment is a crude oil distillation unit.

6. A system as claimed in claim 4, in which the first item of process equipment is selected from the group consisting of a vacuum distillation unit, a hydrocracker, a hydrotreater, a fluid catalytic cracker, an isomerisation unit and a catalytic reforming unit.

7. A system as claimed in claim 1, in which the feedstock is crude oil.

8. A system as claimed in claim 1 additionally comprising one or more analysers for measuring the extent of deterioration in the first item of process equipment.

9. A method of predicting the rate of deterioration of a first item of process equipment, which first item of process equipment receives an inlet stream and discharges one or more outlet streams which are optionally fed to the first item of process equipment, which first item of process equipment is subject to deterioration by one or more deterioration mechanisms, which inlet stream comprises a feedstock or derivative thereof and which method comprises the steps of:
    (a) obtaining values of more than one property of the feedstock,
    (b) calculating a predicted rate of deterioration by the one or more deterioration mechanisms for said first item of process equipment from said values, wherein the predicted rate of deterioration is calculated using a data processor adapted to receive values of more than one property of the feedstock, and adapted to calculate predicted rates of deterioration by the one or more deterioration mechanisms for the first item of process equipment from the values of more than one of the feedstock properties, which data processor is additionally adapted to provide an output comprising information relating to the predicted rates of deterioration by the one or more deterioration mechanisms for the first item of process equipment, and wherein the data processor is a programmed computer and comprises at least one rate model for said first item of process equipment;
    (c) providing an output from the data processor, said output comprising the predicted rate of deterioration for said first item of process equipment, in which the output comprises the predicted rate of deterioration and/or the predicted lifetime of said first item of process equipment for at least one deterioration mechanism, or the lowest calculated predicted lifetime and/or rate of deterioration for said first item of process equipment; and
    (d) receiving a depreciation value for said first item of process equipment; and
    (e) calculating a predicted rate of depreciation for said first item of process equipment, wherein the predicted rate of depreciation is calculated using the data processor adapted to receive the depreciation value for said first item of process equipment, and adapted to calculate the predicted rate of depreciation, which data processor is additionally adapted to provide an output comprising a predicted rate of depreciation for said first item of process equipment.

10. A method as claimed in claim 9, in which the first item of process equipment is related to crude oil refining, the feedstock is crude oil, and the inlet stream is crude oil or a derivative thereof.

11. A method as claimed in claim 10, in which the first item of process equipment is a crude oil distillation unit.

12. A method as claimed in claim 10, in which the properties of the crude oil feedstock are selected from one or more of the total acid number, the naphthenic acid number, the asphaltenes content, the total sulphur content, the content of one or more individual sulphur compounds and the content of one or more of $Na^{2+}$, $Mg^{2+}$, $Ca^{2+}$, $Ba^{2+}$, $Cl^-$, $SO_4^{2-}$, $NO^-3$, $NO2^-$, $CN^-$, transition metal ions, and other heavy main group ions.

13. A method as claimed in claim 9, in which the deterioration mechanisms include one or more selected the group consisting of corrosion, fouling and catalyst deactivation.

14. A method as claimed in claim 9, in which the values of the one or more feedstock properties are calculated from a mixture of feedstock sources.

15. A method as claimed in claim 9 comprising a system according to claim 1.

16. A system as claimed in claim 1, which comprises at least one further item of process equipment.

17. A method as claimed in claim 9, which includes at least one further item of process equipment.

18. A method as claimed in claim 12, in which transition metal ions are ions of Ni, V and/or Fe.

19. A method as claimed in claim 12, in which the other heavy main group ions are As or Hg.

* * * * *